(12) United States Patent
Imahashi

(10) Patent No.: US 8,298,415 B2
(45) Date of Patent: Oct. 30, 2012

(54) WASTEWATER TREATMENT SHIP

(75) Inventor: Soujirou Imahashi, Yokohama (JP)

(73) Assignee: Kanto Kosan Co., Ltd., Yokohama (JP)

( * ) Notice: Subject to any disclaimer, the term of this patent is extended or adjusted under 35 U.S.C. 154(b) by 366 days.

(21) Appl. No.: 12/659,050

(22) Filed: Feb. 24, 2010

(65) Prior Publication Data
US 2011/0147293 A1    Jun. 23, 2011

(30) Foreign Application Priority Data

Dec. 17, 2009  (JP) .................................. 2009-286163

(51) Int. Cl.
    C02F 1/52    (2006.01)
(52) U.S. Cl. ...................... 210/202; 210/205; 210/242.1; 210/257.1; 210/259
(58) Field of Classification Search .................. 210/202, 210/205, 242.1, 242.3, 257.1, 259
See application file for complete search history.

(56) References Cited

FOREIGN PATENT DOCUMENTS
JP  2007-084010  4/2007
JP  2009-045549  3/2009

OTHER PUBLICATIONS

Machine translation of JP 2007-084010 (obtained Apr. 2012).*

* cited by examiner

*Primary Examiner* — Lucas Stelling
(74) *Attorney, Agent, or Firm* — Manabu Kanesaka

(57) ABSTRACT

A wastewater treatment ship is provided which is capable of purifying and treating oil bearing wastewater collected from a ship or the sea, wastewater such as domestic water and of reusing the purified water on the ship and easily discharging it. The wastewater treatment ship has a hull able to navigate by being towed or being self-propelled and a purification treatment unit disposed on the hull and configured to collect, purify, and treat wastewater. The purification treatment unit includes a floated oil collecting tank to collect floated oil collected from raw wastewater tank, a stirring tank having a cylindrical straight drum and a funnel-shaped bottom to stir wastewater taken out from the raw wastewater tank together with a coagulant and a collecting path to discharge precipitates, a plurality of filter treatment tanks to be used in multistage filtering treatment of wastewater in the stirring tank, and purified water tanks.

5 Claims, 3 Drawing Sheets

WASTEWATER TREATMENT SHIP

BACKGROUND OF THE INVENTION

1. Field of the Invention

The present invention relates to a wastewater treatment ship to perform purification treatment on wastewater such as oil bearing wastewater collected from ships, spilled oil in the sea by accidents/mishaps, and domestic wastewater.

2. Description of the Related Art

Oil bearing wastewater including bilge water, tank washing water, polishing and cleaning water for a hull and the like are accumulated in a bottom of a ship. Conventionally, wastewater of this kind, after being stored temporarily in a tanker in a ship, has been collected from the ship by a wastewater collecting ship or wastewater collecting vehicle and conveyed to a land-based purification treatment facility.

However, the steps of collecting oil bearing wastewater from the temporary storing tank require much costs, time, and labors.

To solve these problems, the inventor of the present invention has disclosed, in Japanese Patent No. 4243603, an oil bearing wastewater treatment ship equipped with a waste oil treatment mechanism, which is disposed in an upper and inner portion of a hull being able to navigate by being towed or by being self-propelled, capable of carrying out purification treatment of a large amount of oil bearing wastewater.

The wastewater treatment mechanism has a raw wastewater housing tank to house collected oil bearing wastewater (raw wastewater), a purifying means for removing oil from raw wastewater, a purified water housing tank to house purified water (clean water) dischargeable in the sea and a waste oil housing tank to house oil removed from the raw wastewater as waste oil.

That is, in a oil bearing wastewater treatment ship disclosed in Japanese Patent No. 4243603, oil bearing wastewater and the like produced in other ship are collected to perform oil separating treatment on the site and the purified water can be discharged in the sea.

Therefore, unlike in the conventional case, treatment of collected oil bearing wastewater by a land-based purification treatment facility is not required, whereby costs and operating hours can be reduced.

In the case of a ship, besides the oil bearing wastewater, domestic wastewater produced by personnel aboard (including human waste) is discharged. In the past, the domestic wastewater was thrown away in the sea in a untreated state or after specified treatment, however, in recent years, proper treatment before discharging in the sea in accordance with regulations has been required.

To solve this problem, the inventor of the present invention disclosed, in Japanese Patent Application Laid-open No. 2009-45549, a domestic wastewater treatment ship equipped with a purification treatment mechanism capable of treating a large amount of domestic wastewater which is disposed in the upper and inner portions of a hull being able to be towed. The purification treatment mechanism has a collecting tank to house collected domestic wastewater (raw wastewater), a plurality of treatment tanks such as a stirring tank to perform purification treatment on the raw wastewater, and a tank to house purified water dischargeable in the sea.

That is, in the domestic wastewater treatment ship disclosed in the Japanese Patent Application laid-open No. 2009-45549, domestic wastewater can be collected from other ships and collected domestic wastewater can be purified and treated on the site and purified water can be discharged in the sea.

In the treatment ships disclosed in the Japanese Patent No. 4243603 and Japanese Patent Application laid-open No. 2009-45549, wastewater, after being purified to a specified level, is discharged in the sea and, therefore, purified water cannot be effectively used in a ship.

To solve this problem, the present inventor undertook thorough research to effectively reuse wastewater having undergone purification treatment on the sea. More specifically, a large amount of polishing and cleaning for a tank and water for domestic use other than drinking water is needed by a ship and, therefore, extensive research was made as to whether or not a system to easily reuse wastewater having undergone purification and treatment on the sea for the application described above can be provided.

Moreover, in the case of reusing purified water, a tank that can house a large amount of purified water is needed and tank weight changes greatly depending on amounts of purified water to be housed.

Therefore, in order to stabilize hull balance irrespective of an amount of wastewater to be treated, it is necessary to take, into consideration, procedures for purification treatment and location of each tank and thorough research was undertaken on this regard accordingly.

SUMMARY OF THE INVENTION

With respect to the above, an object of the present invention is to provide a wastewater treatment ship capable of performing purification treatment, on the sea, on wastewater such as oil bearing wastewater collected from a ship or the sea, and domestic wastewater and of reusing the purified water on a ship or easily carrying out a discharge of the purified water.

According to a first aspect of the present invention, there is provided a wastewater treatment ship including a hull able to navigate by being towed or by being self-propelled and a purification treatment unit disposed in said hull so as to collect and purify wastewater, wherein said purification treatment unit made up of a raw wastewater tank to house wastewater, a floated oil collecting tank to house floated oil collected from the raw wastewater tank, a stirring tank having a cylindrical straight drum and a funnel-shaped bottom to stir wastewater taken out from the raw wastewater tank together with a coagulant, precipitates of which are collected from a collection path of its bottom, a plurality of filtering treatment tanks to be used in processes of multi-stage filtering treatment performed on wastewater in the stirring tank, and purified water tanks to house purified water having undergone the filtering treatment, wherein the raw wastewater tank is disposed at a center of a hull in a manner to surround the stirring tank in three directions and wherein the floated oil collecting tank and purified water tank are disposed on one side of the raw wastewater tank in a forward and backward direction of the hull, and wherein the plurality of filtering treatment tank is disposed on an opposite side of the floated oil collecting tank and purified water tank with the raw wastewater tank being interposed between the filtering treatment tanks and floated oil collecting tank and purified water tank.

By configuring as above, the container of the collected oil is positioned on the stern side of the hull and the container of wastewater to undergo each filter treatment is positioned on the stem side of the hull, and the container of reusable purified water is positioned on the stern side of the hull. That is, as the purification treatment progresses, collected substances and/or treated wastewater are arranged, in turn, in a dispersed manner on the hull and, therefore, even if a large amount of wastewater is treated, hull balance can be stabilized. Therefore, it is possible to collect wastewater occurring in other ships or the like, to purify the wastewater on the site, and to reuse the purified water on a ship.

Moreover, the stirring tank to remove suspended substances from wastewater in the raw wastewater tank is covered by the raw wastewater tank in three directions, which can stabilize gravity of the hull.

The stirring tank has the funnel-shaped bottom, which enables precipitates in the stirring tank to be easily collected from the bottom of the tank and, at the time of cleaning the tank, entering of an operator into the tank is not required, which reduces costs and time. The funnel-shaped bottom of the stirring tank causes space to be generated under the tank. Therefore, a driving section of the stirring machine and/or the pump for the collection of precipitates can be disposed in the space, which serves to achieve space saving.

According to the wastewater treatment ship a second aspect of the present invention, the bottoms and side walls in right and left directions of the floated oil collecting tank and the raw wastewater tank are, at least, double structured and wherein the floated oil collecting tank and the raw wastewater tank are disposed adjacent to the purified water tank in forward and backward directions of the hull.

By configuring as above, even if one of walls of the wastewater tanks constructed as above is broken, coming-up of the oil to the sea can be avoided.

According to the wastewater treatment ship of a third aspect of the present invention, a rainwater collecting device having a pipe is provided to transfer rainwater to the purified water tank.

By configuring as above, besides wastewater having undergone purification treatment, rainwater can be also collected into the purified water tank, which enables water for reuse to be efficiently obtained.

According to the wastewater treatment ship of a fourth aspect of the present invention, a plurality of filters is provided to perform multi-stage filtering treatment on wastewater in the stirring tank, wherein the plurality of filters are disposed on a deck of the hull.

By configuring as above, maintenance (replacement, cleaning or the like) of each filter is made easy and, since each of the treatment tanks is disposed in a hull, gravity of the hull can be stabilized.

According to the wastewater treatment ship of a fifth aspect of the present invention, a plurality of filters is provided to perform multi-stage filtering treatment on wastewater in the stirring tank wherein the plurality of filters includes a reverse osmosis membrane filter.

By configuring as above, the filtering treatment using the reverse osmosis membrane enables the removal of impurities other than water such as ions, salts or the like, which can provide purified water of high purity.

Thus, with the above configurations, the wastewater treatment ship is capable of performing purification treatment, on the sea, on wastewater such as oil bearing wastewater collected from a ship or the sea, and domestic wastewater and of reusing the purified water on a ship or easily carrying out a discharge of the purified water.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Figure 1:
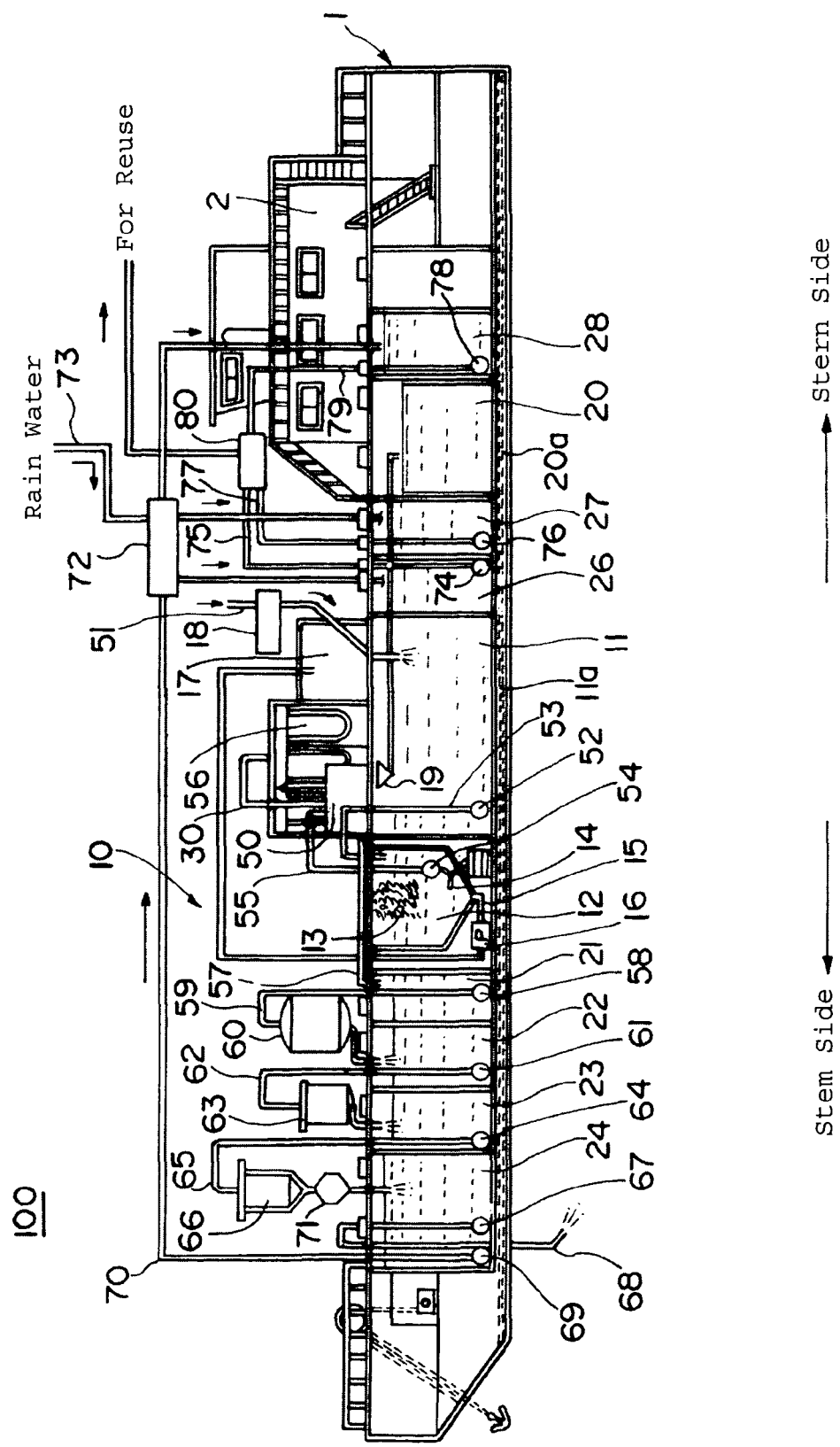
FIG. 1 is a cross sectional view schematically showing a diagrammatical configuration of the wastewater treatment ship of the present invention.
Figure 2:
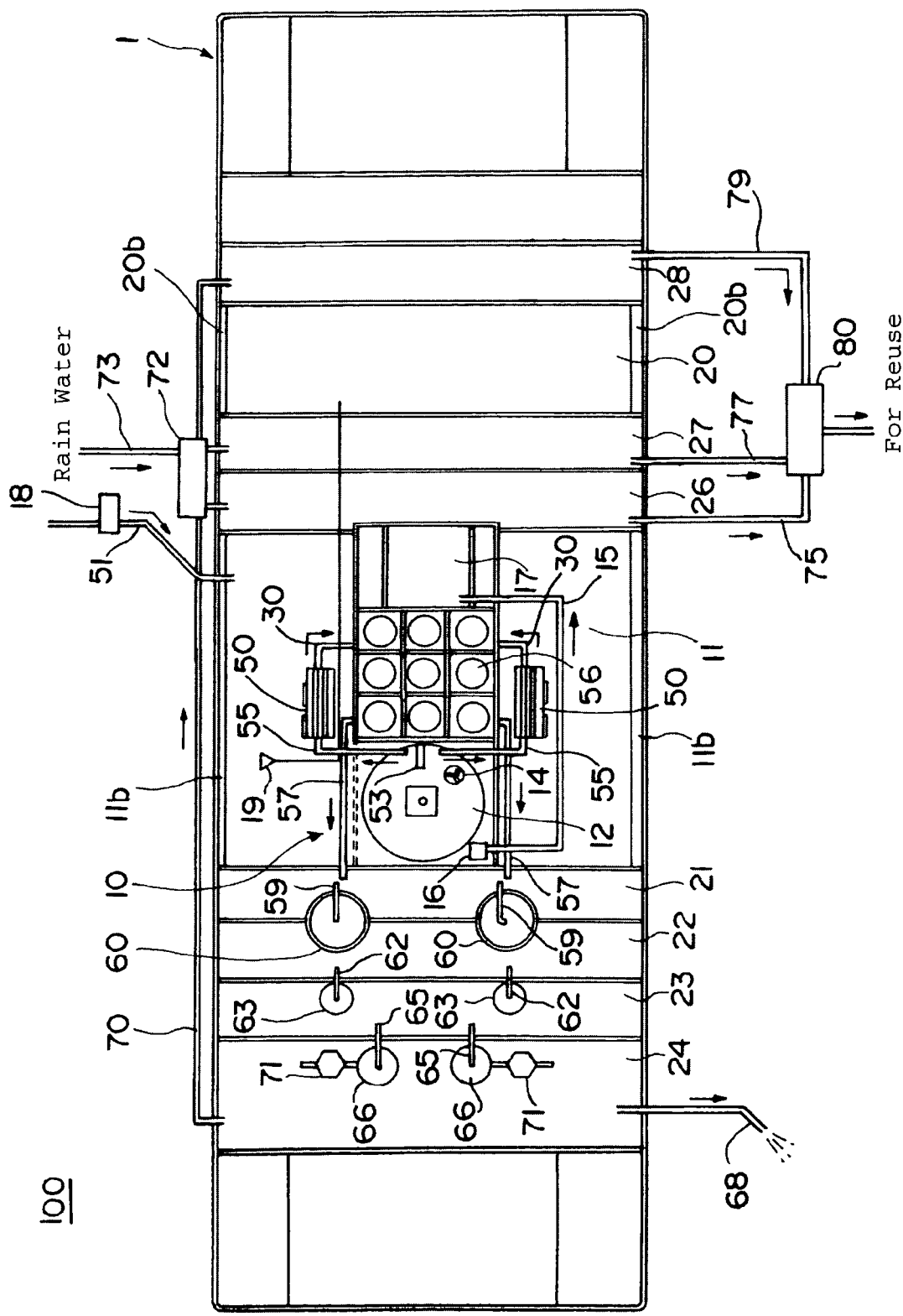
FIG. 2 is a plan view schematically showing a diagrammatical configuration of a purification treatment mechanism provided to the wastewater treatment ship of FIG. 1.

Best modes of carrying out the present invention will be described in further detail using various embodiments with reference to the accompanying drawings. FIG. 1 is a cross sectional view schematically showing a diagrammatical configuration of the wastewater treatment ship 100 of the present invention. FIG. 2 is a plan view schematically showing a diagrammatical configuration of a purification treatment mechanism 10 provided to the wastewater treatment ship 100 of FIG. 1.

The wastewater treatment ship 100 shown in FIG. 1 is constructed so as to be able to navigate by being towed by other self-propelled ship or by being self-propelled and so as to have a flat-bottomed hull 1 equipped with a cabin 2 serving as a control room. Also, the wastewater treatment ship 100 is provided with a purification treatment mechanism 10 (purification treating means) to carry out purification treatment of wastewater such as oil bearing wastewater and domestic wastewater collected from own ship or other ships, which occupies almost all the volume of upper and inner portions of the hull 1. That is, the wastewater treatment ship 100 is a ship to exclusively carry out purification treatment of wastewater including oil bearing wastewater, domestic wastewater, and the like and is constructed so as to be able to collect even a large amount of wastewater for purification treatment.

As shown in FIG. 1 and FIG. 2, a raw wastewater tank 11 to collect raw wastewater such as collected oil bearing wastewater and domestic wastewater (including human waste) is provided at a center portion of the purification treatment mechanism 10, that is, in a position corresponding to a central portion of the hull 1. The raw wastewater tank 11 is disposed in a manner to surround the stirring tank in three directions (i.e. in a U-shaped manner).

Wastewater (raw wastewater) is allowed to flow into the raw wastewater tank 11 through a pipe 51, however, comparatively large suspended solids or the like are removed by a metal filter 18 disposed above the raw wastewater tank 11 before being is housed in the raw wastewater tank 11.

A skimmer 19 (floated oil collecting tank) to suck up oil naturally floated up to an upper portion (surface of wastewater) of collected wastewater is provided in the raw wastewater tank 11. The waste oil sucked up from the skimmer 19 is transferred to one side of the raw wastewater tank 11, more particularly to the floated oil collecting tank 20 disposed on a stern side relative to the raw wastewater tank 11.

As shown in FIG. 2, a stirring tank 12 is provided in a manner being surrounded by the raw wastewater tank 11 in three directions. Wastewater taken out by a pump 52 from the raw wastewater tank 11 is supplied to the stirring tank 12 through a pipe 53.

A coagulant is put into the stirring tank 12 to aggregate suspended substances in wastewater and the wastewater is stirred by a stirring machine 14 disposed in the tank 12 and, as a result, the aggregation of suspended substances occurs, causing the suspended substances to precipitate at the bottom of the tank 12. Here, the stirring tank 12 has a cylindrical straight drum and a funnel-shaped (reversely-conical shaped) bottom, which causes precipitates to naturally gather at a center of its bottom.

Moreover, a collection path 15 to collect precipitates is routed from a central portion of a bottom of the stirring tank 12 and the precipitates in the tank 12 are discharged by a, pump 16 through the collection path 15 out of the tank 12 and are collected by a reminder re-treatment tank 17 disposed in an upper portion of the raw wastewater tank 11. In the reminder re-treatment tank 17, re-purification treatment is performed on reminders, sludge, or the like collected as precipitates in the stirring tank 12.

Moreover, the funnel-shaped bottom of the stirring tank 12 causes space to be generated under the tank 12. Therefore, a driving section of the stirring machine 14 and/or the pump 16 for the collection of precipitates can be disposed in the space, which serves to achieve space saving.

As described above, the reminder re-treatment tank 17 is placed on the upper portion of the raw wastewater tank 11. That is, the reminder re-treatment tank 17 is disposed approximately at the center of the hull 1 and is so configured as to suppress the influence on hull balance caused by weight of the reminders, sludge, or the like.

On an opposite side (stem side) of the floated oil collecting tank 20 with the raw wastewater tank 11 interposed therebetween is disposed, in order, a plurality of filtering treatment tanks 21, 22, and 23 to be used in multi-stage filtering treatment (filtering treatment) processes.

More particularly, wastewater having undergone the treatment in the stirring tank 12 is transferred by a pump 54 through a pipe 55 to a filter press type filtering device 50 above the raw wastewater tank 11. The filter press type filtering device 50 is configured to filter wastewater treated in the high layer portion of the tank transferred from the stirring tank 12 and to remove admixtures thereof. The wastewater having undergone the filtering treatment in the filter press type filtering device 50 is further transferred to a bag filter 56 through a pipe 30. The bag filter 56 is configured to filter wastewater transferred from the filter press type filtering device 50 and to remove admixtures and/or suspended solids.

Moreover, the filter press type filtering device 50 and bag filter 56 adapted to remove comparatively large admixtures and suspended solids are disposed above the raw wastewater tank 11, that is, on a deck approximately in the central portion of the hull 1 and to suppress the influence on hull balance caused by weight of removed admixtures.

The wastewater having undergone the filtering treatment by the bag filter 56 is housed, after being transferred through a pipe 57, in the filtering treatment tank 21 placed on the side adjacent to the stem of the raw wastewater tank 11.

The wastewater in the filtering treatment tank 21 is transferred by a pump 58 through a pipe 59 to a sand filter 60, where admixtures and suspended solids are further removed and are then housed in the filtering treatment tank 22 placed on the side adjacent to the stem of the filtering treatment tank 21. Further, the sand filter 60 is displaced on the deck above the filtering treatment tanks 21 and 22.

The wastewater in the filtering treatment tank 22 is transferred by a pump 61 through a pipe 62 to a precise cartridge filter 63, where more finer contained substances are removed and is then housed in the filtering treatment tank 23 placed on the side adjacent to the stem of the filtering treatment tank 22.

The wastewater in the filtering treatment tank 23 is further transferred by a pump 64 through a pipe 65 to an activated carbon filter 66, where wastewater odor is removed, and filtering treatment is then carried out by a reverse osmosis membrane (RO membrane) filter 71. By the filtering treatment of the reverse osmosis membrane filter 71, impurities such as ions and/or salts other than water are removed to obtain purified water having high purity.

The purified water having undergone the filtering treatment by the reverse osmosis membrane filter 71 is transferred to a discharging tank 24 placed adjacent to the filtering treatment tank 23 on the side of the stem.

Moreover, the cartridge filter 63 is disposed on the deck in an upper position of the filtering treatment tank 23 and the activated carbon filter 66 is disposed on the deck in an upper position of the discharging tank 24. The reverse osmosis membrane filter 71 is placed between the activated filter 66 and discharging tank 24 on the deck.

Thus, each of the filters (filter press type filtering device 50, bag filter 56, sand filter 60, cartridge filter 63, activated carbon filter 66, and reverse osmosis membrane filter 71) is disposed not in an inner portion of the hull 1 but in an upper portion (on the deck) of the hull 1 and, inside the hull 1, each of the treatment tanks is placed. This configuration enables easy maintenance (replacement, cleaning, or the like) and stability of gravity of the hull 1.

The purified water housed in the discharging tank 24 is discharged in the sea by a pump 67 and a pipe 68 or is transferred, for reuse, by a pump 69 and a pipe 70 to purified water tanks 26, 27, and 28 disposed in a forward or back direction of the floated oil collecting tank 20.

As shown in FIG. 1, in the purified water tank 26 are provided the pump 74 and the pipe 75 and in the purified water tank 27 are provided the pump 76 and the pipe 77, and in the purified water tank 28 are provided the pump 78 and the pipe 79 and the purified water in each tank can be transferred for reuse. Each of the pipes 75, 77, and 79 is connected to a valve 80 for switching a flow path and each tank containing purified water can be switched for being transferred.

The hull 1 is equipped with a rainwater collecting path 73 (rainwater collecting means) connected to a valve 72 to collect rainwater. That is, by flow path switching control, rainwater can be transferred, if necessary, to any of the purified water tanks 26 to 28 to be stored. This enables water to be used in a ship to be efficiently secured.

Moreover, the bottoms 20a and 11a of the floated oil collecting tank 20 and raw wastewater tank 11 respectively are, at least, double-structured and side walls 20b and 11b in right and left directions of the hull 1 are also, at least, double-structured. In the forward and backward directions of the hull 1, the floated oil collecting tank 20 is disposed between the purified water tanks 27 and 28.

By configuring as above, even if one of walls of the wastewater tanks (floated oil collecting tank 20 and raw wastewater tank 11) containing a large amount of oil is broken, the oil does not flow into the sea.

Figure 3:
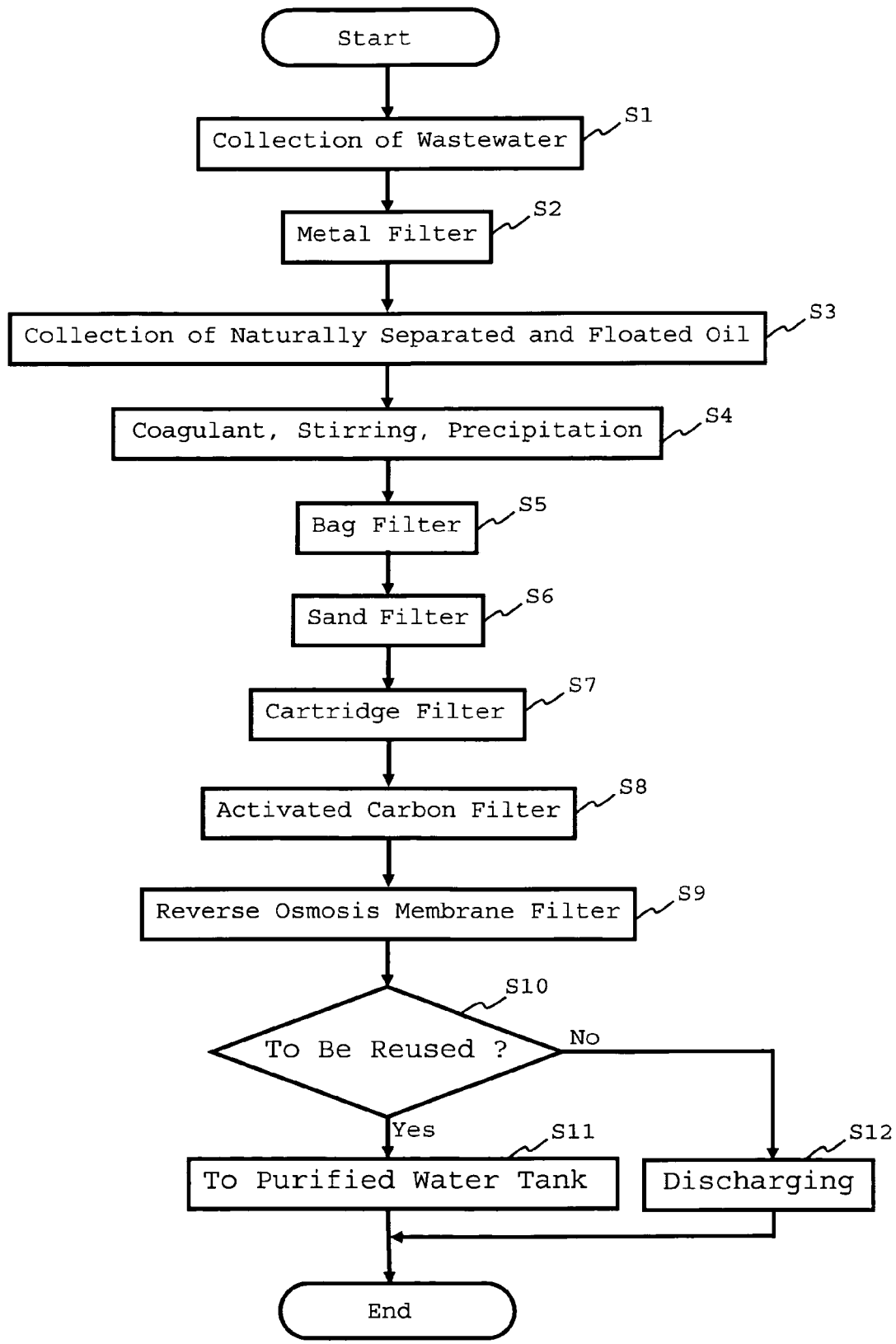
FIG. 3 is a flowchart showing process flow of the purification treatment mechanism installed on the wastewater treatment ship of FIG. 1.

Next, the treatment processes by the purification treatment mechanism 10 of the wastewater treatment ship 100 are described by referring to the flow chart of FIG. 3.

First, raw wastewater containing wastewater such as oil bearing wastewater, domestic wastewater, human waste, or the like collected from own ship or other ships is stored in the raw wastewater tank 11 (Step S1 in FIG. 3). Moreover, at this time of the collection of raw wastewater, wastewater has been filtered by the metal filter 18 and comparatively large waste and refuse such as suspended solids have been removed from the raw wastewater in the raw wastewater tank 11 (Step S2 in FIG. 3).

When raw wastewater in the raw wastewater tank 11 is left to nature, oil floats up to the upper portion containing its surface. The floated oil is collected by the skimmer 19 and is then housed in the floated oil collecting tank 20 (Step S3 in FIG. 3).

Wastewater in the raw wastewater tank 11 is transferred to the stirring tank 12 through the pipe 53. A coagulant 13 is put into wastewater in the stirring tank 12 and is stirred by the stirring machine 14. By this stirring treatment, suspended substances in wastewater are aggregated and precipitates at the bottom of the tank 12 (Step S4 in FIG. 3). The stirring tank 12 has a cylindrical straight drum, thus performing effective stirring treatment and also has a funnel-shaped bottom, thereby gathering precipitates such as a reminder, sludge, or a like at the center of the bottom. The precipitates at the bottom of the stirring tank 12 are transferred through the collection path 15 to be housed into the reminder re-treatment tank 17 and are then re-purified properly.

After the completion of stirring treatment, wastewater contained in the stirring tank 12 passes through the filter press type filtering device 50 via a pipe 55 and is transferred to the bag filter 56 through the pipe 30 (Step S5 in FIG. 3). By the filter press type filtering device 50 and bag filter 56, admixtures and suspended solids in wastewater are removed. The wastewater filtered by the bag filter 56 is transferred through the pipe 57 to be housed in the filtering treatment tank 21.

The wastewater in the filtering treatment tank 21 is transferred through the pipe 59 to the sand filter 60 to further remove admixtures and suspended solids by the filtering treatment and then transferred to be housed in the filtering treatment tank 22 (Step S6 in FIG. 3).

The wastewater in the filtering treatment tank 22 is transferred through the pipe 62 to the precise cartridge filter 63 to remove small and fine contents and is then transferred to be housed in the filtering treatment tank 23 (Step S7 in FIG. 3).

Further, the wastewater in the filtering treatment tank 23 is transferred through a pipe 65 to the activated carbon filter 66 to remove the odor of wastewater (Step S8 in FIG. 3) and is also transferred to the reverse osmosis membrane filter 71 to remove impurities other than water such as ions and salts (Step S9 in FIG. 3).

Wastewater having undergone filtering treatment in the reverse osmosis filter 71 is housed in the discharging tank 24.

Moreover, the purified water in the discharging tank 24 undergoes water examination (for example, hydrogen ion exponent [pH], chemical oxygen demand [COD], biological oxygen demand [BOD], suspended solids (SS), normal hexane extraction content) by using equipment and devices mounted on the ship.

Purified water housed in the discharging tank 24, if it is to be reused (Step S10 in FIG. 3), is transferred through a pipe 70 to be housed in any one of the purified water tanks 26 to 28 (Step S11 in FIG. 3). The purified water housed in the purified water tanks 26 to 28, after each flow path is selected by the valve 80, is discharged respectively through pipes 75, 77, and 79. The discharged purified water is reused as water for domestic use other than drinking water, water for polishing and cleaning water, or the like in other ships or the like.

On the other hand, if the purified water tanks 26 to 28 are filled with purified water, the purified water is discharged to the sea through the pipe 68 (Step S12 in FIG. 3).

Thus, according to the embodiment of the present invention, with the raw wastewater tank 11 (stirring tank 12) at the center of the hull 1 being interposed therebetween, the floated oil collecting tank 20 and purified water tanks 26 to 28 are disposed in the rear portion of the hull 1 and a plurality of filtering treatment tanks 21 to 23 are disposed in the front portion of the hull 1. Moreover, the reminder re-treatment tank 17 is placed above the raw wastewater tank 11.

Relative to the arrangement of this tanks, the container of the collected oil is positioned on the stern side of the hull 1 and the container of the reminder and sludge is positioned approximately on the central location of the hull 1. The container of the wastewater to undergo each filtering treatment is positioned on the stem side and the container of reusable purified water is positioned on the stern side.

That is, as the purification treatment progresses, collected substances and/or treated wastewater are arranged in a dispersed manner on the hull 1 and, therefore, even if a large amount of wastewater is treated, hull balance can be stabilized.

Therefore, it is possible to collect wastewater occurring in the other ship, to purify the wastewater on the site, and to reuse the purified water on own ship.

Moreover, each filter is disposed on the upper portion of the hull 1 and each treatment tank is disposed in the inner portion of the hull 1 (on the deck), thus enabling easy maintenance (replacement, cleaning, or the like) and easy stabilization of gravity of the hull 1.

Also, according to the embodiment of the present invention, a portion surrounding the stirring tank 12 to remove suspended substances from wastewater in the raw wastewater tank is covered by the raw wastewater tank 11 in three directions, and therefore, gravity of the hull 1 can be stabilized.

The stirring tank 12 has the funnel-shaped bottom, which enables precipitates in the stirring tank 12 to be easily collected from the bottom of the tank 12 and, at the time of cleaning the tank 12, entering of an operator into the tank 12 is not required, which reduces costs and time. Further, space is generated under the tank 12 and, therefore, the driving section of the stirring machine 14 or pump 16 for collecting precipitates can be disposed in the space, thus achieving space saving.

What is claimed is:
1. A wastewater treatment ship comprising:
a hull able to navigate by being towed or by being self-propelled; and
a purification treatment unit disposed in said hull so as to collect and purify wastewater;
wherein said purification treatment unit comprising:
a raw wastewater tank to house wastewater;
a floated oil collecting tank to house floated oil collected from said raw wastewater tank;
a stirring tank having a cylindrical straight drum and a funnel-shaped bottom to stir a coagulant together with wastewater taken out from said raw wastewater tank, wherein precipitates formed in said stirring tank are collected via a collection path connected to said bottom;
a plurality of filtering treatment tanks to be used in processes of multi-stage filtering treatment performed on wastewater in said stirring tank; and
purified water tanks to house purified water having undergone said filtering treatment;
wherein said raw wastewater tank is disposed at a center of said hull in a manner to surround said stirring tank and wherein said floated oil collecting tank and said purified water tanks are both disposed on a first side of said raw wastewater tank in a first direction where said first direction is either in a direction toward a stern of the hull or in a direction toward a stem of the hull, and
wherein said plurality of filtering treatment tanks is disposed on a second side of said raw wastewater tank in a second direction, where said second direction is opposite of said first direction, such that said raw wastewater tank is disposed between said floated oil collecting tank and said purified water tanks on said first side and the plurality of filtering treatment tanks on said second side.

2. The wastewater treatment ship according to claim 1, wherein said floated oil collecting tank and said raw wastewater tank each have a bottom and a sidewall on the left side of the hull and a sidewall on the right side of the hull, said bottoms and sidewalls of said floated oil collecting tank and said raw wastewater tank are double structured.

3. The wastewater treatment ship according to claim 1, further comprising a rainwater collecting device having a pipe to transfer rainwater to said purified water tanks.

4. The wastewater treatment ship according to claim 1, further comprising a plurality of filters to perform said multistage filtering treatment on wastewater in said stirring tank, wherein said plurality of filters is disposed on a deck of said hull.

5. The wastewater treatment ship according to claim 1, further comprising a plurality of filters to perform said multistage filtering treatment on wastewater in said stirring tank wherein said plurality of filters includes a reverse osmosis membrane filter.

* * * * *